(12) United States Patent
Li

(10) Patent No.: US 10,237,706 B2
(45) Date of Patent: Mar. 19, 2019

(54) METHOD AND APPARATUS FOR ESTABLISHING COMMUNICATION BETWEEN MOBILE TERMINALS, INCOMING COMMUNICATION CONTROL AND OUTGOING COMMUNICATION CONTROL AND SYSTEM BY USE THEREOF

(71) Applicant: Alibaba Group Holding Limited, George Town (KY)

(72) Inventor: Zhiguo Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 30 days.

(21) Appl. No.: 14/937,469

(22) Filed: Nov. 10, 2015

(65) Prior Publication Data
US 2016/0134751 A1   May 12, 2016

(30) Foreign Application Priority Data
Nov. 10, 2014   (CN) .......................... 2014 1 0644008

(51) Int. Cl.
*H04M 1/57* (2006.01)
*H04W 4/16* (2009.01)
(Continued)

(52) U.S. Cl.
CPC ....... *H04W 4/16* (2013.01); *H04M 1/274508* (2013.01); *H04M 1/57* (2013.01); *H04M 1/665* (2013.01); *H04M 19/04* (2013.01)

(58) Field of Classification Search
CPC ... H04W 4/16; H04M 1/274508; H04M 1/57; H04M 1/665; H04M 19/04
See application file for complete search history.

(56) References Cited

U.S. PATENT DOCUMENTS

| 5,857,022 A | 1/1999 | Sudia |
|---|---|---|
| 6,324,645 B1 | 11/2001 | Andrews et al. |

(Continued)

FOREIGN PATENT DOCUMENTS

| CN | 101267674 A | 9/2008 |
|---|---|---|
| CN | 101291362A A | 10/2008 |

(Continued)

*Primary Examiner* — David Orange

(57) ABSTRACT

A method of establishing communication between mobile terminals includes receiving a communication request from a caller terminal, the communication request including at least a caller number and information for determining an identification code of a callee terminal, the information including a number of the callee terminal or an owner name of the callee terminal. The method also includes obtaining the identification code of the callee terminal based on the information and inquiring about a corresponding record associated with the caller terminal and the callee terminal by use of a pre-stored address book referencing relationship and a communication history, based on the caller number and the identification code of the callee terminal. The method further includes computing a communication right value based on the corresponding record and determining whether the computed communication right value exceeds a pre-determined threshold. In response to a determination that the computed communication right value exceeds the pre-determined threshold, communication between the caller terminal and the callee terminal is established.

36 Claims, 8 Drawing Sheets

(51) Int. Cl.
*H04M 1/665* (2006.01)
*H04M 1/2745* (2006.01)
*H04M 19/04* (2006.01)

(56) References Cited

U.S. PATENT DOCUMENTS

| | | | |
|---|---|---|---|
| 8,265,589 B2 | 9/2012 | Heit et al. | |
| 8,942,705 B1 | 1/2015 | Prock et al. | |
| 8,972,592 B1 | 3/2015 | Delker et al. | |
| 8,984,078 B2 | 3/2015 | Nerieri | |
| 8,990,914 B2 | 3/2015 | Da Cruz Pinto et al. | |
| 9,007,416 B1 | 4/2015 | Murgia et al. | |
| 9,014,974 B2 | 4/2015 | Venkatraman et al. | |
| 9,021,108 B2 | 4/2015 | Brown et al. | |
| 9,049,707 B2 | 6/2015 | Ding et al. | |
| 9,055,154 B2 | 6/2015 | Griffin et al. | |
| 9,060,074 B2 | 6/2015 | Wagner et al. | |
| 9,060,381 B2 | 6/2015 | Tarte et al. | |
| 9,071,987 B2 | 6/2015 | Steer et al. | |
| 9,083,434 B2 | 7/2015 | Gunnarsson et al. | |
| 9,087,420 B2 | 7/2015 | Amirpour et al. | |
| 9,106,801 B2 | 8/2015 | Larsson et al. | |
| 9,124,704 B2 * | 9/2015 | Griffin | H04W 8/205 |
| 9,147,119 B2 | 9/2015 | Prakash et al. | |
| 9,173,153 B2 | 10/2015 | Miklos et al. | |
| 9,185,631 B2 | 11/2015 | Srikrishna et al. | |
| 9,191,789 B2 | 11/2015 | Pan | |
| 9,210,260 B2 | 12/2015 | Lu | |
| 9,225,748 B2 | 12/2015 | Bridge et al. | |
| 9,232,386 B2 | 1/2016 | Mannepally | |
| 9,241,353 B2 | 1/2016 | Do et al. | |
| 9,262,769 B2 | 2/2016 | Bove Bofill et al. | |
| 2001/0026609 A1 * | 10/2001 | Weinstein | G06Q 30/0601 379/93.01 |
| 2002/0056050 A1 * | 5/2002 | Heiden | G06F 21/33 726/10 |
| 2005/0033957 A1 * | 2/2005 | Enokida | H04L 63/0442 713/156 |
| 2006/0135197 A1 | 6/2006 | Jin et al. | |
| 2007/0165821 A1 | 7/2007 | Altberg et al. | |
| 2008/0101584 A1 | 5/2008 | Gray et al. | |
| 2008/0182568 A1 | 7/2008 | Kim | |
| 2010/0317341 A1 * | 12/2010 | Ferren | H04M 1/663 455/426.1 |
| 2011/0211572 A1 | 9/2011 | Campion et al. | |
| 2011/0213974 A1 | 9/2011 | Ardon et al. | |
| 2012/0144198 A1 | 6/2012 | Har et al. | |
| 2013/0195264 A1 | 8/2013 | Kirchhoff et al. | |
| 2014/0162698 A1 * | 6/2014 | Han | H04W 4/00 455/456.3 |
| 2014/0164776 A1 * | 6/2014 | Hook | H04L 9/14 713/171 |
| 2014/0310263 A1 | 10/2014 | Liu et al. | |
| 2015/0126149 A1 * | 5/2015 | Zhang | H04M 1/72586 455/405 |
| 2015/0169664 A1 * | 6/2015 | Roh | H04W 4/00 707/609 |

FOREIGN PATENT DOCUMENTS

| | | | | |
|---|---|---|---|---|
| CN | 103167500 A | 6/2013 | | |
| CN | 103916836 A | 7/2014 | | |
| CN | 104066065 A | 9/2014 | | |
| EP | 2328334 A1 * | 6/2011 | | H04L 51/32 |
| EP | 2328334 A1 | 6/2011 | | |
| EP | 2328344 A1 | 6/2011 | | |
| WO | WO 2012001016 A1 * | 1/2012 | | H04M 3/543 |
| WO | WO2013012354 8 A2 * | 8/2013 | | G06F 21/6218 |

* cited by examiner

METHOD AND APPARATUS FOR ESTABLISHING COMMUNICATION BETWEEN MOBILE TERMINALS, INCOMING COMMUNICATION CONTROL AND OUTGOING COMMUNICATION CONTROL AND SYSTEM BY USE THEREOF

CROSS REFERENCE TO RELATED APPLICATION

This application claims the benefits to Chinese Patent Application No. 201410644008.1, filed on Nov. 10, 2014, which is incorporated herein by reference in its entirety.

TECHNICAL FIELD

The present disclosure relates generally to mobile communication, and more particularly to a method and apparatus for establishing communication between mobile terminals, incoming communication control and outgoing communication control, as well as a communication system by use thereof.

BACKGROUND

Conventional mobile communication system operates on phone numbers. In other words, in order to establish communication with a callee, a caller dials a number of the callee directly. A problem with this system lies in that, any random caller can dial the number of a callee to reach the callee, leading to potential harassment for the callee.

A common practice to solve the above described problem is for a callee to utilize programs such as a smart phone app "incoming call master" or an incoming call firewall to provide limitations on which caller numbers can establish communication with the callee. When there is a bad history associated with a caller number, the system will deny the incoming call automatically. In general, such limitations are configured by the app or firewall in the form of a white list or a black list of the caller numbers. However, with this approach, a callee can only determine whether or not to accept an incoming call based on a caller number, without any assistance from other information such as the contacts contained in the address book or the communication history between the parties.

Therefore, there exists a need to solve the problem of establishing communication between mobile terminals by use of their address books and communication history.

SUMMARY

The present disclosure provides for a method and apparatus for establishing communication between mobile terminals for the purpose of solving the problem in the prior art that communication between a caller and a callee cannot be established by use of the relationship of their address books or their communication history. The present disclosure further provides for a method and apparatus for incoming communication control, outgoing communication control, as well as a communication system by use thereof.

According to an exemplary embodiment of the present disclosure, a method of establishing communication between mobile terminals includes the step of receiving a communication request from a caller terminal, the communication request comprising at least a caller number and information for determining an identification code of a callee terminal, the information comprising a number of the callee terminal or an owner name of the callee terminal. The method also includes the steps of obtaining the identification code of the callee terminal based on the information and inquiring about a corresponding record associated with the caller terminal and the callee terminal by use of a pre-stored address book referencing relationship and a communication history, based on the caller number and the identification code of the callee terminal. The method further includes the steps of computing a communication right value based on the corresponding record and determining whether the computed communication right value exceeds a pre-determined threshold. In response to a determination that the computed communication right value exceeds the pre-determined threshold, the method establishes communication between the caller terminal and the callee terminal.

According to another exemplary embodiment of the present disclosure, an apparatus for establishing communication between mobile terminals includes a receiving module, an obtaining module, an inquiring module, a computing module and a determination module. The receiving module is configured for receiving a communication request from a caller terminal, the communication request comprising at least a caller number and information for determining an identification code of a callee terminal, the information comprising a number of the callee terminal or a name of an owner of the callee terminal. The obtaining module is configured for obtaining the identification code of the callee terminal based on the information. The inquiring module is configured for inquiring about a corresponding record associated with the caller terminal and the callee terminal by use of a pre-stored address book referencing relationship and a communication history, based on the caller number and the identification code of the callee terminal. The computing module is configured for computing a communication right value based on the corresponding record. The determination module is configured for determining whether the computed communication right value exceeds a pre-determined threshold and in response to a determination that the computed communication right value exceeds the pre-determined threshold, establishing communication between the caller terminal and the callee terminal.

Alternatively, the address book referencing relationship is determined by use of on data of entire contacts in a local address book of a client terminal registered with a server, and the apparatus further comprises a generation module. The generation module includes a reading sub-module, an obtaining sub-module, a determination sub-module and a generating sub-module. The reading sub-module is configured for reading from the local address book of the client terminal registered with the server. The obtaining sub-module is configured for browsing through the contacts of the local address book to obtain record information of a contact person. The determination sub-module is configured for determining an identification code utilized by the contact person to register with the server, based on the record information of the contact person. The generating sub-module is configured for determining the address book referencing relationship existing between the client terminals, and recording the address book referencing relationship as that a client terminal corresponding to the contact person is referenced by the local address book of the client terminal registered at the server.

According to yet another exemplary embodiment of the present disclosure, a method of incoming communication control includes the steps of receiving by a callee terminal a communication establishment request from a caller and determining whether the caller is a pre-configured server. In response to a determination that the caller is a pre-configured server, the method further includes the steps of causing a user notification and displaying information of at least one from the group of the information related to a caller terminal requesting communication with the callee terminal through the server; and the information of relationship of the caller terminal with respect to the callee terminal. In response to a determination that the caller is a not pre-configured server, the method includes the step of notifying the caller to send the communication establishment request through the server.

According to still yet another exemplary embodiment of the present disclosure, an apparatus for incoming communication control includes a receiving module, a determination module, a connection module and a rejection module. The receiving module is configured for receiving by a callee terminal a communication establishment request from a caller. The determination module is configured for determining whether the caller is a pre-configured server. The connection module is configured for, in response to a determination that the caller is a pre-configured server, causing a user notification and displaying information of at least one from the group of the information related to a caller terminal requesting communication with the callee terminal through the server, and the information of relationship of the caller terminal with respect to the callee terminal. The rejection module configure for, in response to a determination that the caller is a not pre-configured server, notifying the caller to send the communication establishment request through the server.

According to an exemplary embodiment of the present disclosure, a method of outgoing communication control includes the steps of a caller terminal sending a communication request to a pre-configured server, where the communication request comprises at least a caller number and information for determining an identification code of a callee terminal, the information comprising a number of the callee terminal or an owner name of the callee terminal.

According to another exemplary embodiment of the present disclosure, an apparatus for outgoing communication control includes a sending module, which is configured for sending by a caller terminal a communication request to a pre-configured server, where the communication request comprises at least a caller number and information for determining an identification code of a callee terminal, the information comprising a number of the callee terminal or an owner name of the callee terminal.

According to yet another exemplary embodiment of the present disclosure, a communication system includes an above described apparatus for establishing communication between mobile terminals, an above described apparatus for incoming communication control and an apparatus for outgoing communication control.

Compared with the existing technology, the present disclosure provides for improvement that communication between mobile terminals can be establishing based on the relationship between their address books and their communication history, preventing the problem of any random caller being able to dial a callee number, and achieving the result of only trusted callers being able to reach a callee terminal.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-10. However, those skilled in the art will readily appreciate that the detailed description given herein with respect to these figures is for explanatory purposes as the disclosure extends beyond these limited embodiments.

Figure 1:
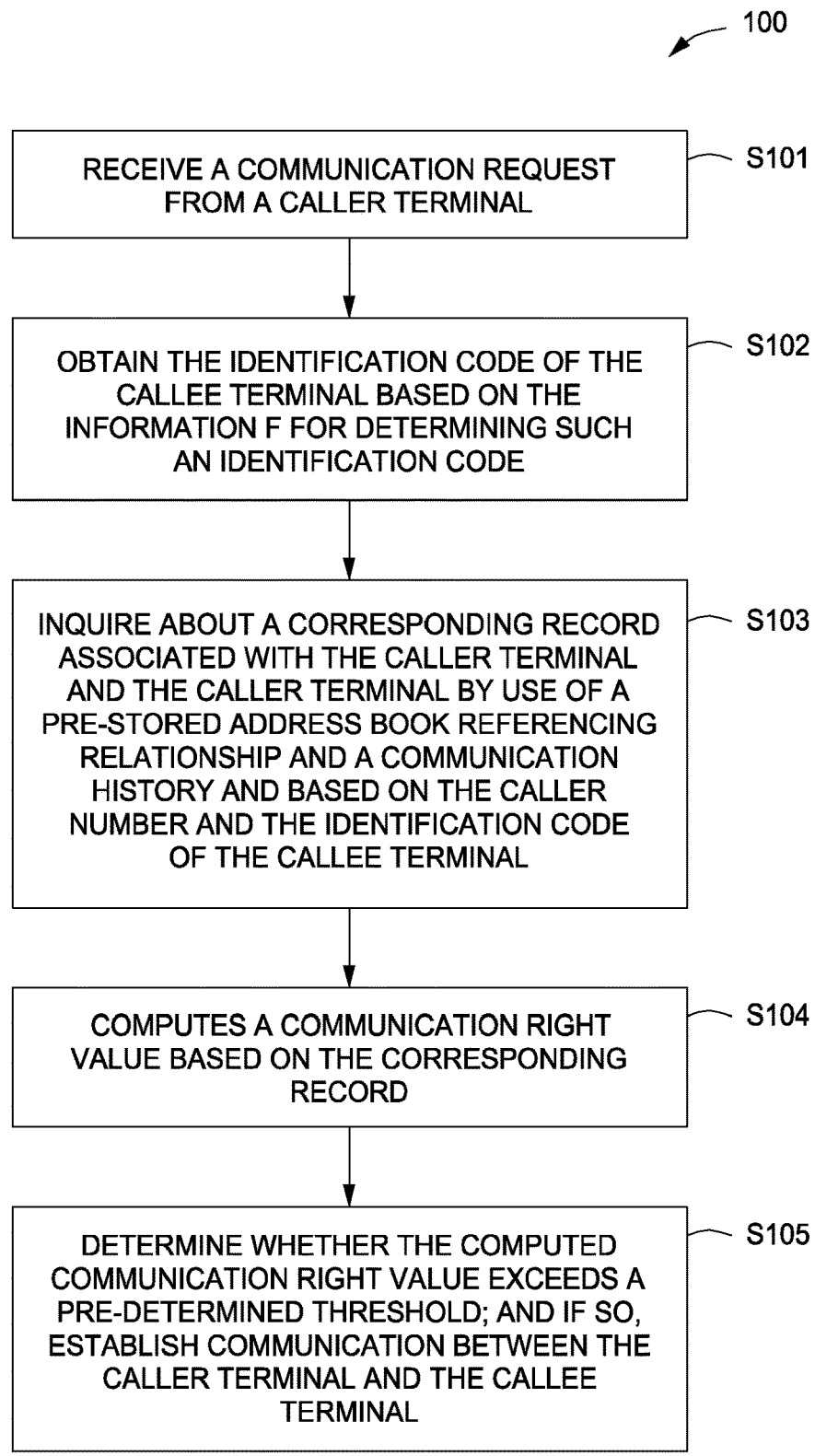
FIG. 1 is a flow chart of an exemplary method of establishing communication between mobile terminals in accordance with an embodiment of the present disclosure.

Referring to FIG. 1, a flow chart of an exemplary method of establishing communication between mobile terminals in accordance with an embodiment of the present disclosure is shown. The method 100 starts in step S101, where a communication request from a caller terminal is received. The communication request includes at least a caller number, as well as the information for determining an identification code of a callee terminal. Such information for determining an identification code of a callee terminal includes a number of the callee terminal or an owner name of the callee terminal.

According to this embodiment of the present disclosure, a callee terminal as described above refers to a client terminal that has registered with a server. In particular, when a callee terminal registers with a server, the server generates for the callee terminal a corresponding identification code, which is the unique identification code of the registered callee terminal recognized by the server. Such identification code can be utilized to obtain the profile information of the callee terminal as well as its account registration information. For example, the profile information may include information such as the number of the callee terminal, the owner name of the callee terminal, etc. The account registration information may include information such as the account name and the account password, etc.

In step S102, the identification code is obtained for the callee terminal based on the information for determining such an identification code for the callee terminal. According to this embodiment of the present disclosure, such information for determining an identification code for the callee terminal includes the number of the callee terminal, or the owner name of the callee terminal. Due to the fact that different callee terminals have associated therewith different mobile numbers, the identification code of the callee terminal can be accurately obtained through the mobile number associated with the callee terminal. However, as the owner names associated with the different callee terminals might be the same, when the communication request sent from the caller terminal includes an owner name of the callee terminal, the identification code of the callee terminal can nevertheless be obtained by use of both the caller number and the owner name of the callee terminal.

In step S103, records corresponding to both parties are inquired about from a pre-stored address book referencing relationship and a communication history, based on the caller number and the identification code of the callee terminal. The address book referencing relationship as described in the present disclosure is determined by use of an address book local to a mobile client terminal. For example, if there exists an entry of contact of the party B in the phone address book of the party A's client terminal, there is an address book referencing relationship between the party A's client terminal and the party B's client terminal.

Figure 2:
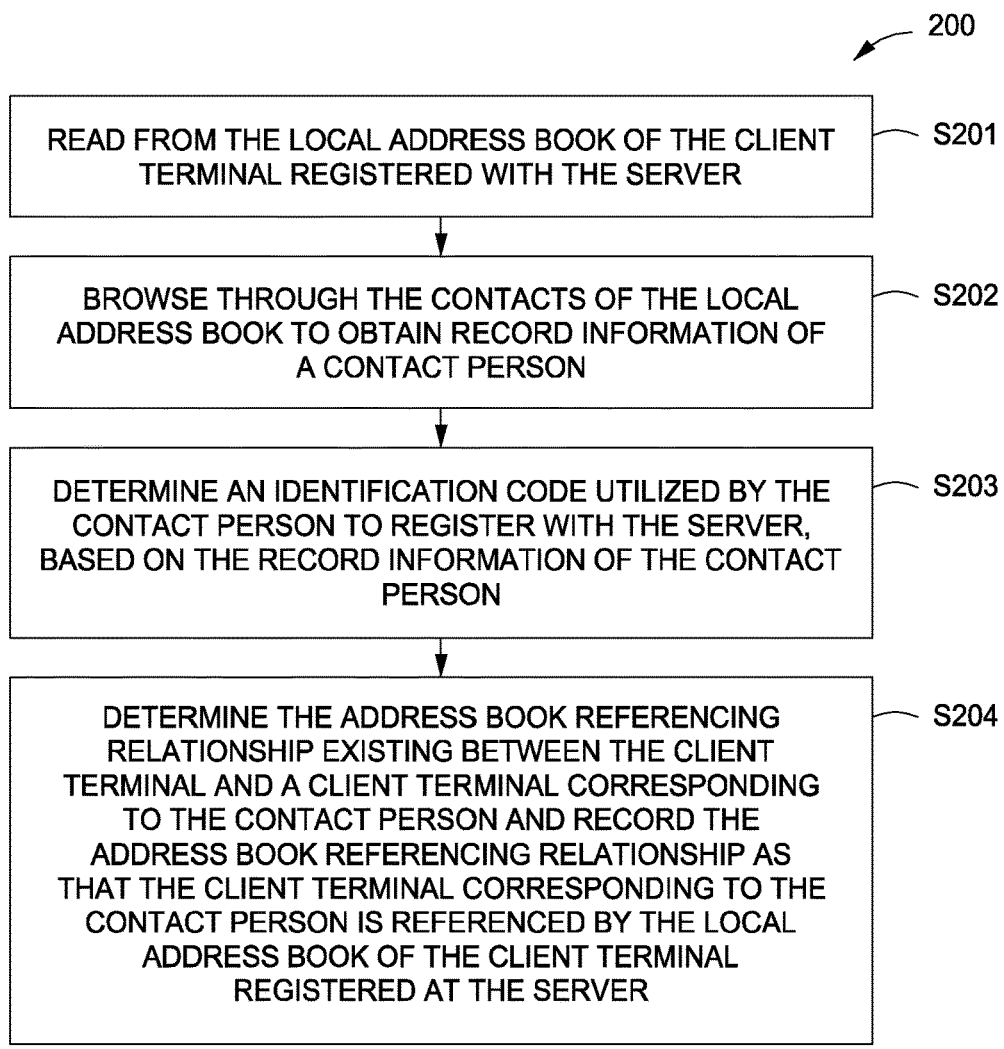
FIG. 2 is a flow chart of an exemplary method of generating an address book referencing relationship in accordance with an embodiment of the present disclosure.

Referring to FIG. 2, a flow chart of an exemplary method of generating an address book referencing relationship in accordance with an embodiment of the present disclosure is shown. In this embodiment, the address book referencing relationship is generated based on the entire contact person data of the local address book of a client terminal registered with the server. The method 200 starts in step S201, where the local address book stored at a client terminal registered with the server is read. The method 200 then proceeds to step S202, where the record information is obtained for a contact person by browsing through the contacts enlisted in the local address book. In step S203, an identification code utilized by the contact person for registration with the server is determined based on the record information of the contact person. In this embodiment, a contact person enlisted in the local address book of a client terminal refers to a client terminal registered at the server, whose identification code at the server can also be obtained utilizing the record information of the contact person (e.g., the mobile phone number).

In step S204, it is determined whether there exists an address book referencing relationship between the two parties. If so, the address book referencing relationship is recorded to indicate that the client terminal corresponding to the contact person has been referenced in the address book of the client terminal registered at the server.

In this embodiment, if the recorded address book referencing relationship related to the party A's client terminal and the party B's client terminal indicates that only the party A's client terminal is referenced in the address book of the party B client terminal, or only the party B's client terminal is referenced in the address book of the party A's client terminal, the address book referencing relationship related to the both parties is referred as an unidirectional referencing relationship. On the contrary, if the recorded relationship indicates that the party A's client terminal is referenced in the address book of the party B's client terminal and at the same time the party B's client terminal is referenced as well in the address book of the party A's client terminal, the address book referencing relationship related to the both parties is referred as a bidirectional referencing relationship. If a reference relationship related to the both parties is unidirectional, a record number for the referencing relationship related to the both parties is set as 1, and if a reference relationship related to the both parties is bidirectional, a record number for the referencing relationship related to the both parties is set as 2.

Figure 3:
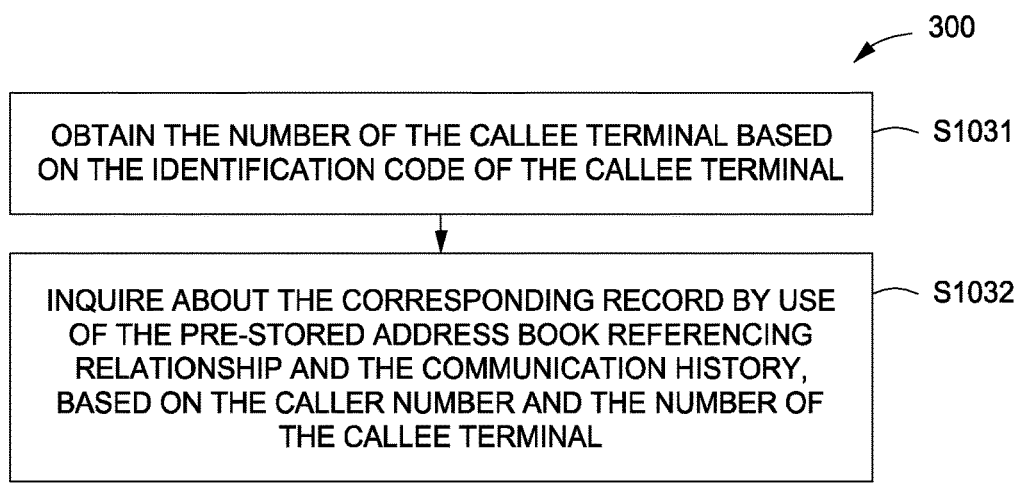
FIG. 3 is a flow chart of exemplary method of the step S103 of FIG. 1, in accordance with an embodiment of the present disclosure.

Referring to FIG. 3, a flow chart of an exemplary method of step S103 of FIG. 1 in accordance with an embodiment of the present disclosure is shown. In this embodiment, the method 300, by use of the caller number and the identification code of the callee terminal, to inquire about a record corresponding to both parties from a pre-stored address book referencing relationship and the communication history starts in step S1031 and concludes in step S1032. In step S1031, the number of the callee terminal is obtained based on the identification code of the callee terminal. In step S1032, a record corresponding to both parties is looked up from the address book referencing relationship and the communication history, based on the caller number and the callee terminal number. In some embodiments, the communication history records the communication history information for different client terminals about the past communication that are established through the server. The history may include information such as the caller number, the callee number and the duration or number of the communication sessions, etc.

Referring back to FIG. 1, in step S104, a communication right value is computed based on the record corresponding to the both parties. In some embodiments, the right value as described is computed based on the address book referencing relationship between the caller terminal and the callee terminal, and the communication history between the caller terminal and the callee terminal. For example, the right value can be computed by the sum of the record number for the referencing relationship related to the both parties and the record number related to the communication history related to the both parties.

In step S105, it is determined whether the computed communication right value exceeds a pre-determined right threshold. If so, communication will be established between the caller terminal and the callee terminal. The pre-determined right threshold as described in the present disclosure refers to a pre-configured threshold for permitting communication between the two mobile terminals. Such threshold value can nevertheless be adjustable. If the communication right value between the caller terminal and the callee terminal exceeds the pre-determined right threshold, the caller terminal will be determined to have a right to establish communication with the callee terminal. The determination by use of the comparison of a right value to a threshold, and other variation of determinations are mere alternative implementations of embodiments of the present disclosure.

Further, phone numbers belongs to an important part of users' privacy and are prone to disclosure or theft both at storage and during communication. For example, after communication is established between a caller terminal and a callee terminal, the display of the number of the caller terminal on the screen of the callee terminal will lead to the disclosure of the number of the caller terminal number. A common approach to hide the real numbers is to utilize virtual numbers in place of the real numbers. This approach can be implemented by generating a virtual communication number which is similar to a phone number and associating the virtual number with the real phone number. However, this approach has to employ a virtual number, which is of similarly importance as the hidden real phone number. Therefore, this approach does not actually solve the problem of how to hide phone numbers.

In this embodiment, at least one of the caller terminal and the callee terminal has all the phone numbers in the address book displayed in the form of virtual numbers. As the caller terminal establishes communication with the callee terminal through a server, and both the caller terminal and the callee terminal are registered client terminals with the server, their profile information has already been stored at the server. Therefore, it is only necessary for the local address books of the caller terminal and the callee terminal to store the names of the contacts and consequently having the numbers of the contacts hidden. In some embodiments, the caller terminal and the callee terminal can set a universal virtual number for all the numbers of contacts in the address books so as to hide the real numbers contained in the local address book and prevent the theft of the local address book.

Figure 4:
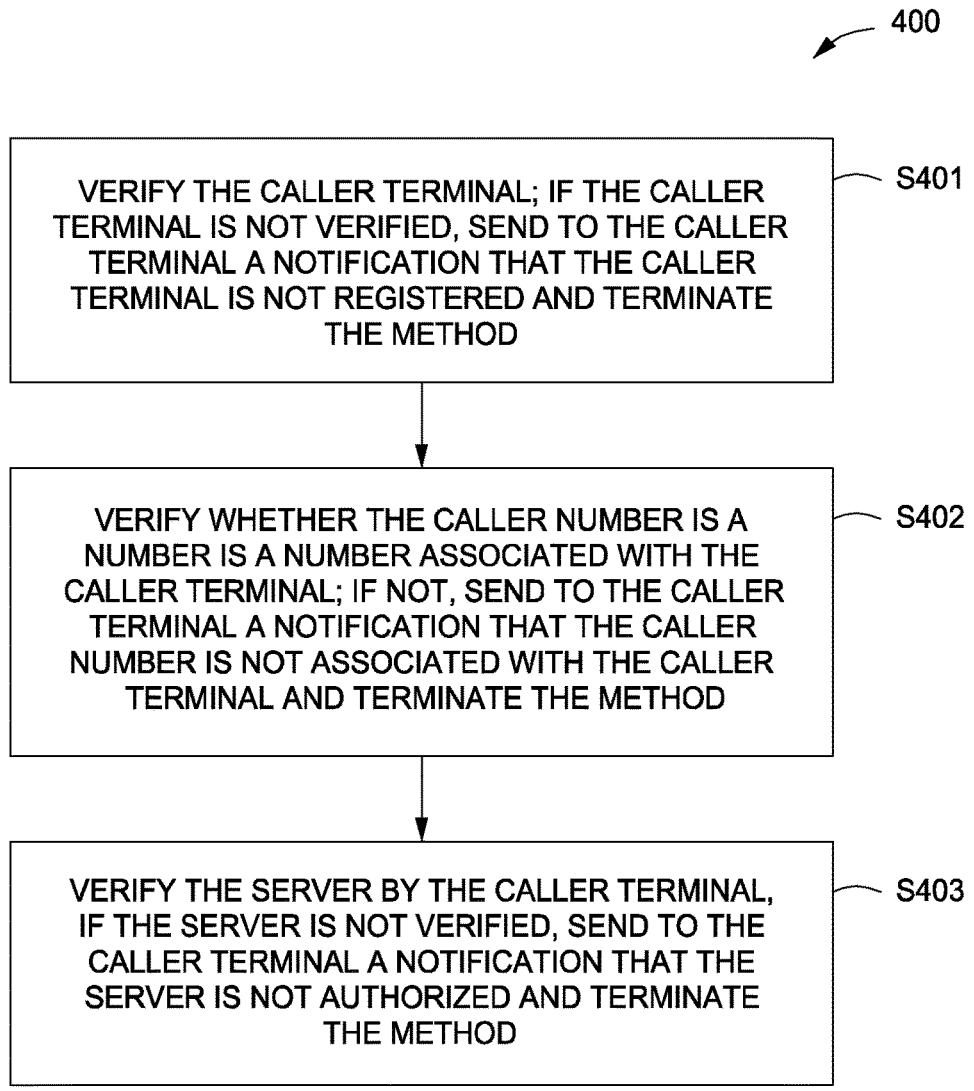
FIG. 4 is a flow chart of an exemplary method of verification prior to the step S101 of FIG. 1, in accordance with an embodiment of the present disclosure.

Referring now to FIG. 4, a flow chart of an exemplary method of verification prior to step S101 of FIG. 1 in accordance with embodiments of the present disclosure is shown. For security concerns, the caller terminal and the server need to be verified as an authorized party from each other's perspective. In other words, the caller terminal is a client terminal registered with the server, and the server is an authorized server verified by the caller terminal. In this embodiment, prior to the step of receiving a communication request from the caller terminal, the method 400 starts in step S401, where the identity of the caller terminal is verified. If the caller terminal cannot be successfully verified, a notification is sent to the caller terminal informing that the caller terminal has not yet registered. The method 400 further terminates the process of establishing communication between the caller terminal and the callee terminal.

In step S402, after the verification of the caller terminal, it is further determined whether the number of the caller is the mobile phone number associated with the caller terminal. If not, a notification is sent to the caller terminal informing that the caller number is an un-associated mobile phone number for the caller terminal. Afterwards, the method 400 further terminates the process of establishing communication between the caller terminal and the callee terminal.

In this embodiment, with the verification by the server for the caller terminal and the verification of the caller number being the associated mobile phone number for the caller terminal, unauthorized parties upon theft of a client terminal, are prevented from utilizing the client side private key stored at the client terminal to log in the server to dial the contacts in the address book of the client terminal which is associated with the mobile phone number.

In some alternative embodiments, the verification can be performed by use of short messaging code to verify whether the caller number is the mobile phone number associated with the caller terminal. In implementations, after the server generates a verification code, it sends the verification code to the mobile phone number associated with the caller terminal. If the caller terminal utilizes the associated mobile phone number to which the server sends the verification short messaging code, the caller terminal will send back to the server the received verification code. The server compares the received verification code to the previously generated verification code to determine whether the two verification codes are identical. If so, it can be determined that the caller number is the mobile phone number associated with the caller terminal, and the method 400 continues to the remaining steps for establishing communication between the caller terminal and the callee terminal.

In some embodiments, when a caller terminal needs to start with a new phone number, it can send to the server, utilizing its prior mobile phone number, a notification that the caller terminal is to switch to a new phone number. Consequently, the server will release the prior associated number and instead associate the new phone number with the caller terminal.

In step S403, the identity of the server is verified by the caller terminal. If the server cannot be verified by the caller terminal, a notification is sent to the caller terminal informing that the server is an unauthorized server, and the method 400 further terminates the process of establishing communication between the caller terminal and the callee terminal.

In some embodiments, the verification for the caller terminal can be performed by use of digital certificates, with the caller terminal storing the client side private key and the server storing the client side public key. In general, the digital certificate system usually employs a public key mechanism, i.e., utilizing a pair of keys for encryption and decryption. A user configures a private key that is only known to the user himself, and utilizes the private key for decryption and signing. Also, the user configures a public key, which is published by the user and shared amongst a group of users for encryption and signature verification. When sending a confidential document, the sending party utilizes the receiving party's public key to encrypt the document, while the receiving party decrypts the document utilizing the receiving party's private key upon receipt of the encrypted document. With this, information can be delivered to intended parties in a secure manner. Further, the use of the digital processing assures encryption to be an irreversible process, i.e. only a corresponding private key can decrypt the information encrypted with the corresponding public key.

A common practice for the public key cryptography is to employ a RSA system. The user can nevertheless utilize his or her own private key to encrypt the information, as the private key is only known to the individual user, parties other than the user would not be able to generate the same information, i.e., the digital signature. By use of digital signatures, two things can be assured: firstly, the information is signed by the signing party, who cannot deny or it is difficult for the signing party to deny the action; secondly, the information has not been modified from the signing till the reception, i.e., it is an authentic copy of the original information.

In this embodiment, the server utilizing digital certificates to verify the caller terminal is implemented by, the server utilizing the client side public key, which is previously stored at the server, to verify the client terminal and to determine whether the caller terminal is a registered client terminal.

In order to utilize digital certificates to verify the caller terminal by the server, first of all a client side private key and a client side public key are generated. In this embodiment, the client side private key and the client side public key of the digital certificate of the caller terminal are generated based on the profile information of the caller terminal. Such profile information includes at least the owner name of the caller terminal and the mobile phone number of the caller terminal.

After the generation of the client side private key and the client side public key, the client side private key is stored locally at the caller terminal. In some embodiments, the client side private key locally stored at the caller terminal is an encrypted client side private key. With an encrypted client side private key, pre-caution measurements can be taken against potential thefts of the client side private key, which may lead to unauthorized signing of digital signatures and counterfeiting of the client terminal. Further, after the client terminal generates the client side private key and client side public key, the public key will be published to the server for the purpose of verifying the identity of the client terminal.

Figure 5:
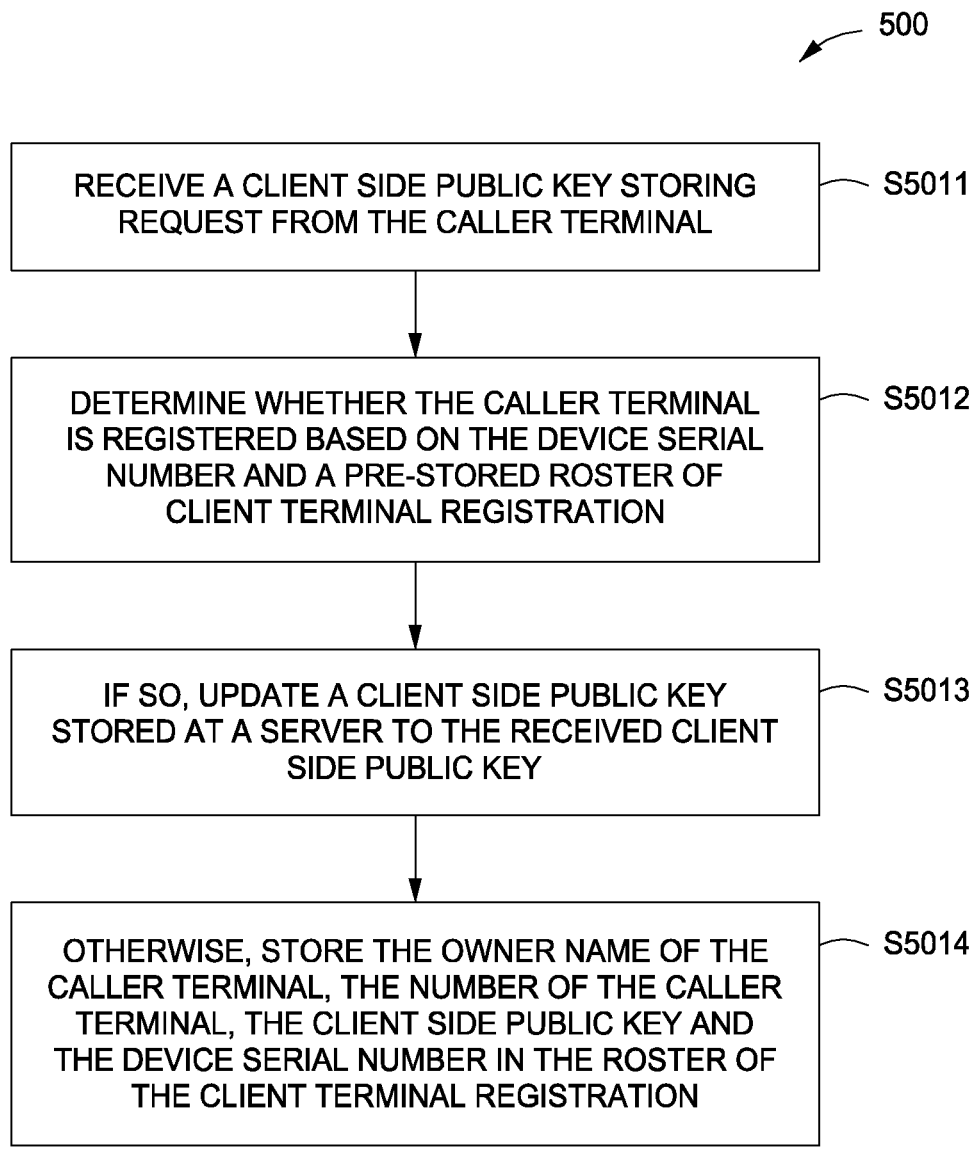
FIG. 5 is a flow chart of an exemplary method of obtaining and storing a client side public key of a caller terminal, in accordance with an embodiment of the present disclosure.

Referring to FIG. 5, a flow chart of an exemplary method of obtaining and storing a client side public key prior to the step of verifying the caller terminal, in accordance with an embodiment of the present disclosure is shown. The method 500 starts in step S5011, where a client side public key storing request is received from the caller terminal. The request includes at least the client side public key, a device serial number of the caller terminal, the owner name of the caller terminal and the mobile phone number of the caller terminal.

In step S5012, it is determined whether the caller terminal is registered with the server based on the device serial number and a pre-stored register of client terminal. The register of client terminal includes the profile information of the client terminal and the client side public key. The profile information includes the client terminal's owner name, the mobile phone number and the device serial number, etc.

In step S5013, if in step S5012 the caller terminal is determined as a registered client terminal, the client side public key stored at the server is updated with the received client side public key. Because the caller terminal is a registered client terminal with the server, when the client terminal regenerates a new client side digital certificate, it is only necessary to update the client side public key stored at the server based on the device serial number of the client terminal, instead of generating an entire registration record for the client terminal.

In step S5014, if in step S5012 the caller terminal is determined not being a registered client terminal, the owner name of the client terminal, the mobile phone number, the client side public key and the device serial number will all be stored in the register of client terminal.

Similarly, a caller terminal can also utilize digital certificates to verify the servers. In particular, the server stores its own server side private key, and the caller terminal stores the server side public key. A caller terminal utilizing digital certificates to verify the servers is implemented by the caller terminal utilizing a server side public key pre-stored at the caller terminal to verify the identity of the server so as to determine whether the server is an authorized server. In general, a counterfeited server does not have the authorized server's private key, and therefore would not be able to pass the verification. While an authorized server can utilize its own server side private key to perform digital signature and therefore be able to pass the verification. Such verification of the server by the caller terminal resolves the problem of counterfeited servers caused by falsifying the server address pre-configured at the caller terminal by a third party program.

In this embodiment, the caller terminal and the server can utilize Transport Layer Security (TLS) based digital certificates to perform a mutual verification on each other's identity. In implementations, other approaches may be applied under the circumstances, for example, a user may be assigned a user account, and the likes. Different variation of verification methods are mere implementations of embodiments of the present disclosure.

Figure 6:
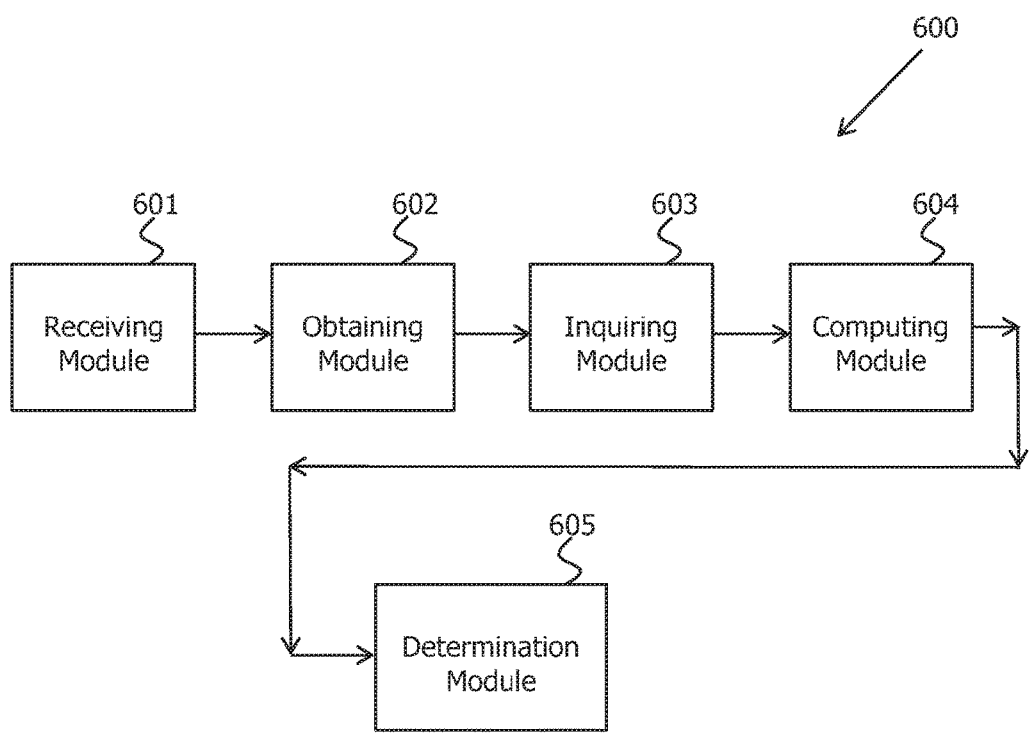
FIG. 6 is a block diagram of an exemplary apparatus for establishing communication between mobile terminals in accordance with an embodiment of the present disclosure.

Referring to FIG. 6, a block diagram of an exemplary apparatus for establishing communication between mobile terminals in accordance with embodiments of the present disclosure is shown. The details that are substantially similar to the first embodiment are not repeated herein for the purpose of simplicity. Pertinent details are illustrated as the first embodiment described above.

The apparatus 600 includes a receiving module 601, an obtaining module 602, an inquiring module 603, a computing module 604 and a determination module 605. The receiving module 601 is configured for receiving a communication request from a caller terminal, the communication request including at least a caller number and information for determining an identification code of a callee terminal, wherein the information includes a number of the callee terminal or a name of an owner of the callee terminal. The obtaining module 602 is configured for obtaining the identification code of the callee terminal based on the information. The inquiring module 603 is configured for inquiring about a corresponding record by use of a pre-stored address book referencing relationship and a communication history, based on the caller number and the identification code of the callee terminal. The computing module 604 is configured for computing a communication right value based on the corresponding record. The determination module 605 is configured for determining whether the computed communication right value exceeds a pre-determined threshold and in response to a determination that the computed communication right value exceeds the pre-determined threshold, establishing communication between the caller terminal and the callee terminal.

Alternatively, the apparatus includes a generation module configured for generating the address book referencing relationship. The generation module includes a reading sub-module, an obtaining sub-module, a determination sub-module and a generating sub-module. The reading sub-module is configured for reading from the local address book of the client terminal registered with the server. The obtaining sub-module is configured for browsing through the contacts of the local address book to obtain record information of a contact person. The determination sub-module is configured for determining an identification code utilized by the contact person to register with the server, based on the record information of the contact person. The generating sub-module is configured for determining the address book referencing relationship existing between the both parties, and recording the address book referencing relationship as that a client terminal corresponding to the contact person is referenced by the local address book of the client terminal registered at the server.

Further alternatively, the inquiring module 603 includes an obtaining sub-module and an inquiring sub-module. The obtaining sub-module is configured for obtaining a number of the callee terminal, based on the identification code of the callee terminal. The inquiring sub-module is configured for inquiring about the corresponding record by use of the pre-stored address book referencing relationship and the communication history, based on the caller number and the number of the callee terminal.

Still further alternatively, the apparatus can include a first verification module configured for the caller terminal to verify the server and to send to the caller terminal a notification that the server is not authorized if the server is not verified, and terminating establishing the communication. The apparatus can also include a second verification module configured for verifying the caller terminal and sending to the caller terminal a notification that the caller terminal is not registered if the caller terminal is not verified, and terminating establishing the communication. The apparatus can also include a third verification module configured for verifying whether the caller number is a mobile phone number associated with the caller terminal and sending to the caller terminal a notification that the caller number is not the mobile phone number associated with the caller terminal if the caller number is not verified as the number associated with the caller terminal, and terminating establishing the communication.

Yet still further alternatively, the apparatus can include a public key obtaining module configured for obtaining and storing a client side public key for the caller terminal. Alternatively, the public key obtaining module includes a receiving sub-module, a determination sub-module, a updating sub-module and a registering sub-module. The receiving sub-module is configured for receiving a client side public key storing request from the caller terminal, the requesting including at least the client side public key, a device serial number of the caller terminal, the owner name of the caller terminal and the mobile phone number of the caller terminal. The determination sub-module is configured for determining whether the caller terminal is registered based on the device serial number and a pre-stored register of client terminal. The updating sub-module is configured for, in response to a determination that the caller terminal is registered, updating a client side public key stored at a server with the received client side public key. And the registering sub-module is configured for, in response to a determination that the caller terminal is not registered, storing the owner name of the caller terminal, the mobile phone number of the caller terminal, the client side public key and the device serial number in the register of the client terminal.

Figure 7:
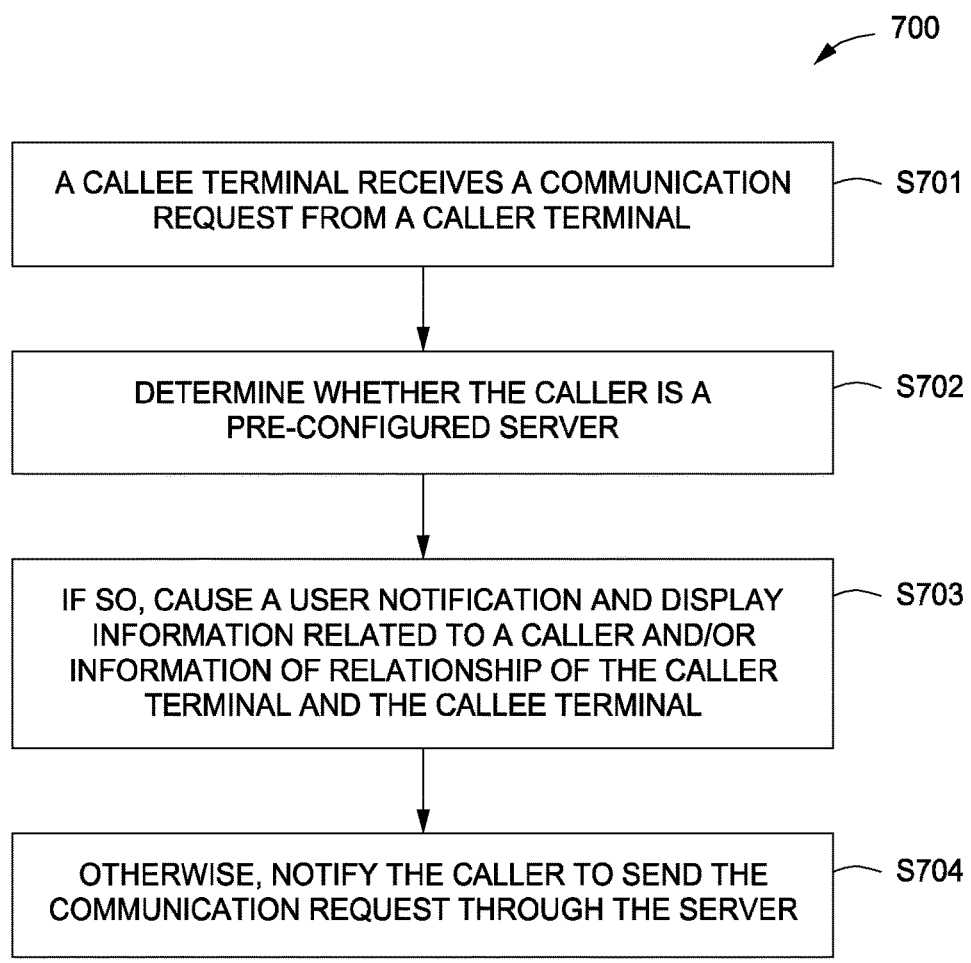
FIG. 7 is a flow chart of an exemplary method of incoming communication control in accordance with an embodiment of the present disclosure.

Referring to FIG. 7, a flow chart of an exemplary method of incoming communication control in accordance with embodiments of the present disclosure is shown. The details that are substantially similar to the first embodiment are not repeated herein for the purpose of simplicity. Pertinent details are illustrated as the first embodiment described above.

The method 700 starts in step S701, where the callee terminal receives a communication establishment request from a caller terminal. In step S702, it is determined whether the caller is a pre-configured server. A pre-configured server is responsible for establishing communication between a caller terminal and a callee terminal. The details pertinent to establishing communication between mobile terminals through the pre-configured server are illustrated in the first embodiment described above. The callee terminal is a client terminal registered with the server, and the caller can be an actual caller terminal or a pre-configured server.

In step S703, if it is determined in step S702 that the caller is the pre-configured server, the callee terminal is caused to notify the incoming communication (e.g., ring the ring tone), and to display at least one of the following two types of information: information related to the caller terminal that requests communication with the callee terminal through the server, and information of relationship of the caller terminal with respect to the callee terminal. In this embodiment, the information related to the caller terminal includes at least one of the following: an owner name of the caller terminal, a mobile phone number of the caller terminal, a geographic position of the caller terminal. The information of relationship includes at least the counted number of communication sessions between the caller terminal and the callee terminal according to a communication history. The information related to the caller terminal and the information of relationship is stored at the server.

In step S704, if in step S702 it is determined that the caller is not the pre-configured server, the caller is notified to send the communication establishment request through the pre-configured server.

With the method of incoming communication control, the callee terminal is a registered client terminal of the server, therefore the caller terminal has to dial through the server in order to reach the number of the callee terminal. The caller terminal cannot directly dial the number of the callee terminal, preventing any random caller terminal from dialing the number of the callee terminal.

In this embodiment, at least one of the caller terminal or the callee terminal has an address book containing all the contact numbers displayed in the form of the virtual numbers. The caller terminal establishes communication with the callee terminal through a server, and both the caller terminal and the callee terminal are registered client terminals with the server, their profile information has already been stored at the server. Therefore, it is only necessary for the local address books of the caller terminal and the callee terminal to store the names of the contacts and consequently having the numbers of the contacts hidden. In some embodiments, the caller terminal and the callee terminal can set a universal virtual number for all the numbers of contacts in the address books so as to hide the real numbers contained in the local address book and prevent the theft of the local address book.

Figure 8:
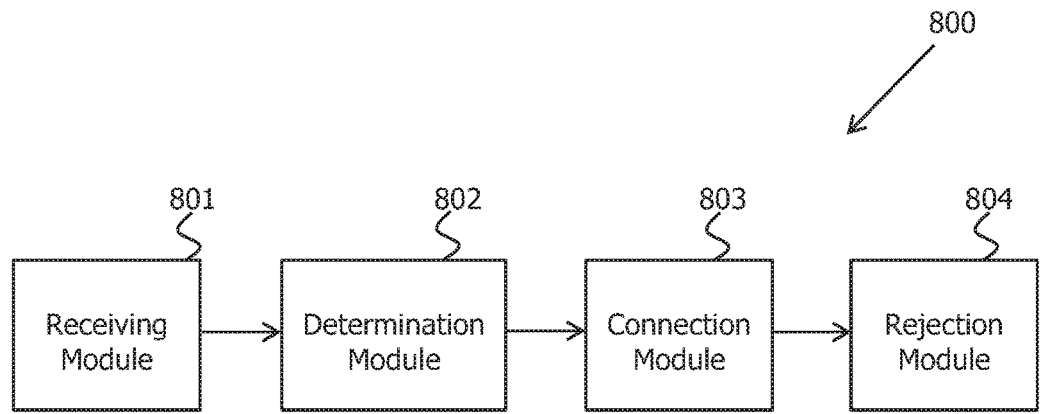
FIG. 8 is a block diagram of an exemplary apparatus for incoming communication control in accordance with an embodiment of the present disclosure.

Referring to FIG. 8, a block diagram of an exemplary apparatus for incoming communication control in accordance with embodiments of the present disclosure is shown. The details that are substantially similar to the method embodiment are not repeated herein for the purpose of simplicity. Pertinent details are illustrated as the method embodiment described above.

The apparatus 800 includes a receiving module 801, a determination module 802, a connection module 803 and a rejection module 804. The receiving module 801 is configured for receiving, by a callee terminal, a communication request from a caller. The determination module 802 is configured for determining whether the caller is a pre-configured server. The connection module 803 is configured for, in response to a determination that the caller is a pre-configured server, causing a user notification and displaying at least one of the following information: the information related to a caller terminal requesting communication with the callee terminal through the server, and the information of relationship of the caller terminal and the callee terminal. The rejection module 804 is configured for, in response to a determination that the caller is a not pre-configured server, notifying the caller to send a communication request through the server.

Figure 9:
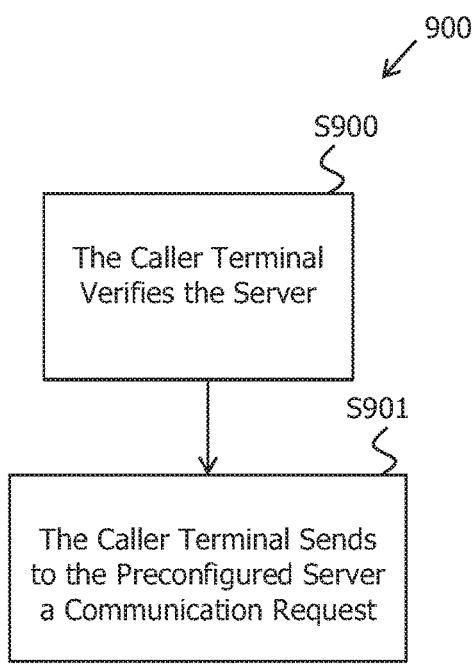
FIG. 9 is a flow chart of an exemplary method of outgoing communication control in accordance with an embodiment of the present disclosure.

Referring to FIG. 9, a method of outgoing communication control in accordance with embodiments of the present disclosure is shown. The details that are substantially similar to the first embodiment are not repeated herein for the purpose of simplicity. Pertinent details are illustrated as the first embodiment described above.

The method 900 starts in step S900, where, prior to a caller terminal sending a communication request to a pre-configured server, the caller terminal verifies the identity of the pre-configured server. In step S901, the caller terminal sends the communication request to the pre-configured server. The communication request includes at least at least the caller number and information for determining an identification code of the callee terminal. The information includes the number of the callee terminal or an owner name of the callee terminal.

The pre-configured server is the server responsible for establishing communication between a caller terminal and a callee terminal. The method of establishing communication between mobile terminals through the pre-configured server is illustrated in the first embodiment. Both the caller terminal and the callee terminal are registered client terminals of the server.

In this embodiment, at least one of the caller terminal and the callee terminal has all the numbers in the address book displayed in the form of virtual numbers. The caller terminal establishes communication with the callee terminal through a server, and both the caller terminal and the callee terminal are registered client terminals with the server, their profile information has already been stored at the server. Therefore, it is only necessary for the local address books of the caller terminal and the callee terminal to store the names of the contacts and consequently having the numbers of the contacts hidden. In some embodiments, the caller terminal and the callee terminal can set a universal virtual number for all the numbers of contacts in the address books so as to hide the real numbers contained in the local address book and prevent the theft of the local address book.

Furthermore, a corresponding apparatus for outgoing communication control is also provided in accordance with embodiments of the present disclosure. The apparatus includes a sending module configured for sending, by a caller terminal, a communication request to a pre-configured server. The communication request comprises at least a caller number and information for determining an identification code of a callee terminal, the information for determining an identification code of a callee terminal comprising a number of the callee terminal or an owner name of the callee terminal. Alternatively, the apparatus includes a verification module configured for the caller terminal to verify the server.

Figure 10:
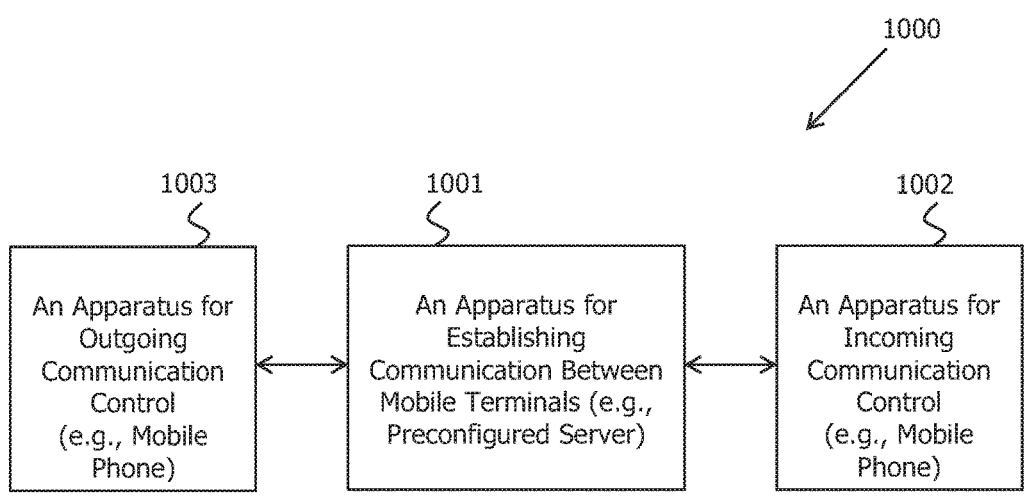
FIG. 10 is a block diagram of an exemplary apparatus for outgoing communication control in accordance with an embodiment of the present disclosure.

Referring to FIG. 10, a block diagram of an exemplary communication system in accordance with an embodiment of the present disclosure is shown. The communication system 1000 includes an apparatus 1001 for establishing communication between mobile terminals, an apparatus 1002 for incoming communication control and an apparatus 1003 for outgoing communication control. Apparatus 1001, generally being implemented as a server, can be otherwise implemented in the form of any types of apparatus that can establish communication between mobile terminals. Apparatus 1002 and apparatus 1003 generally are mobile communication devices or terminals. For example, apparatus 1002 and apparatus 1003 can both be implemented and configured on smart phone device(s). On one hand, apparatus 1003, by sending to a server a request to establish communication, dials the number of the callee terminal through the server such that the caller number is not displayed on the screen of the callee terminal. On the other hand, apparatus 1002 can determine whether the caller is the server with which it is registered. If no, apparatus 1002 will notify the caller terminal to send the communication request through a server. Otherwise, apparatus 1002 will obtain and display information related to the caller number, as well as the information of relationship of the caller number and the callee number so as to prevent any random caller from being able to establish communication with a client terminal.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of establishing communication between mobile phones, the method comprising:
   determining, and storing an association between, a first phone number and a first owner of a first mobile phone, the first mobile phone having a first address book;
   determining, and storing an association between, a second phone number and a second owner of a second mobile phone, the second mobile phone having a second address book;
   assigning a value to a relationship variable that depends on whether the first address book includes the second phone number, and whether the second address book includes the first phone number;
   obtaining a value of a history variable that depends on collected data, the collected data including a selection from a group consisting of a number of past calls and a duration of past calls between the first and second mobile phones;
   storing an association between the relationship variable, the history variable, the first phone number, and the second phone number;
   receiving a telephone call from the first mobile phone to connect the first mobile phone to the second mobile phone, the telephone call identifying the first phone number of the first mobile phone and an identity of the second mobile phone;
   determining the second phone number from the identity of the second mobile phone;
   retrieving from storage the value of the relationship variable and the value of the history variable based on the first phone number and the second phone number;
   mathematically operating on the relationship value and the history value associated with the first and second mobile phones to generate a communication right value; and
   establishing a telephone connection between the first mobile phone and the second mobile phone when the communication right value passes a predetermined threshold, the predetermined threshold being adjustable.

2. The method of claim 1, wherein the identity of the second mobile phone includes the second phone number.

3. The method of claim 1, wherein the duration of past calls includes a total length of time of past calls between the first and second mobile phones, and the number of past calls includes a total number of calls between the first and second mobile phones.

4. The method of claim 3, wherein assigning a value to the relationship variable includes:
   assigning a first number to the value of the relationship variable when:
      the second phone number is not in the first address book, and the first phone number is in the second address book; or
      the second phone number is in the first address book, and the first phone number is not in the second address book; and assigning a second number to the value of the relationship variable when the second phone number is in the first address book and the first phone number is in the second address book.

5. The method of claim 1, wherein the communication right value is determined by adding the value of the relationship variable to the value of the history variable.

6. The method of claim 1, wherein at least one of the first address book and the second address book includes phone numbers displayed as virtual numbers.

7. The method of claim 1, further comprising:
receiving a verification request from the first mobile phone; and
transmitting verification information to the first mobile phone.

8. The method of claim 7, wherein the verification information transmitted to the first mobile phone is a digital certificate.

9. The method of claim 1, further comprising:
receiving a device identification from the first mobile phone;
verifying that the device identification from the first mobile phone matches a stored device identification for the first mobile phone;
transmitting an invalid device identification notification to the first mobile phone when the device identification fails to match the stored device identification; and
terminating the telephone call with the first mobile phone after the invalid device identification notification has been transmitted.

10. The method of claim 9, further comprising, when the device identification matches the stored device identification:
determining whether the first phone number is associated with the first mobile phone;
transmitting an invalid phone number notification to the first mobile phone when the first phone number is not associated with the first mobile phone; and
terminating the telephone call with the first mobile phone after the invalid phone number notification has been transmitted.

11. The method of claim 10, wherein the verification of whether the first phone number is associated with the first mobile phone is based on short messaging code verification.

12. The method of claim 9, wherein the device identification is a digital certificate.

13. The method of claim 12, wherein the digital certificate of the first mobile phone includes a client side private key and a client side public key, the client side private key and the client side public key being generated based on information associated with the first mobile phone, including at least an owner name of the first mobile phone and a phone number of the first mobile phone.

14. The method of claim 12, wherein a client side private key stored at the first mobile phone is encrypted.

15. The method of claim 12, further comprising, obtaining and storing a client side public key of the first mobile phone.

16. The method of claim 15, wherein the obtaining and storing the client side public key of the first mobile phone includes:
receiving a client side public key storing request from the first mobile phone that includes at least the client side public key, a device serial number of the first mobile phone, the first owner's name of the first mobile phone and the first phone number of the first mobile phone;
determining whether the first mobile phone is registered based on whether the device serial number matches a pre-stored serial number stored in a device register;
in response to a determination that the first mobile phone is registered, updating a client side public key with the received client side public key; and
in response to a determination that the first mobile phone is not registered, storing the first owner's name of the first mobile phone, the first phone number of the first mobile phone, the client side public key and the device serial number in the device register.

17. A non-transitory computer-readable medium having computer-readable instructions stored thereon to be executed by a computer, the instructions including a method comprising:
determining and storing a first identification of a first mobile phone, the first mobile phone having a first address book;
determining and storing a second identification of a second mobile phone, the second mobile phone having a second address book;
assigning a value to a relationship variable that depends on whether the first address book includes a listing for the second mobile phone, and whether the second address book includes a listing for the first mobile phone;
obtaining a value of a history variable that depends on collected data, the collected data including a selection from a group consisting of a number of past calls and a duration of past calls between the first and second mobile phones;
storing an association between the relationship value, the history value, the first identification of the first mobile phone, and the second identification of the second mobile phone;
receiving a telephone call from the first mobile phone to connect the first mobile phone to the second mobile phone, the telephone call identifying the first mobile phone and the second mobile phone;
retrieving from storage the value of the relationship variable and the value of the history variable based on the first identification of the first mobile phone and the second identification of the second mobile phone;
mathematically operating on the relationship value and the history value associated with the first and second mobile phones to generate a communication right value; and
establishing a telephone connection between the first mobile phone and the second mobile phone when the communication right value passes a predetermined threshold, the predetermined threshold being adjustable.

18. The method of claim 17, wherein the second identification of the second mobile phone is a phone number of the second mobile phone.

19. The method of claim 17, wherein assigning a value to the relationship variable includes:
assigning a first number to the value of the relationship variable when:
the second mobile phone is not on a contact list in the first address book, and the first mobile phone is on a contact list in the second address book; or
the second mobile phone is on the contact list in the first address book, and the first mobile phone is not on the contact list in the second address book; and
assigning a second number to the value of the relationship variable when the second mobile phone is on the contact list in the first address book and the first mobile phone is on the contact list in the second address book.

20. The method of claim 17, further comprising:
receiving a verification request from the first mobile phone; and
transmitting verification information to the first mobile phone.

21. The method of claim 17, further comprising:
receiving a device identification from the first mobile phone;
verifying that the device identification from the first mobile phone matches a stored device identification for the first mobile phone;
transmitting an invalid device identification notification to the first mobile phone when the device identification fails to match the stored device identification; and
terminating the telephone call with the first mobile phone after the invalid device identification notification has been transmitted.

22. The method of claim 21, further comprising, when the device identification matches the stored device identification:
determining whether the phone number from the first mobile phone is associated with the first mobile phone;
transmitting an invalid phone number notification to the first mobile phone when the phone number from the first mobile phone is not associated with the first mobile phone; and
terminating the telephone call with the first mobile phone after the invalid phone number notification has been transmitted.

23. The method of claim 21, further comprising, obtaining and storing a client side public key of the first mobile phone.

24. The method of claim 23, wherein obtaining and storing the client side public key of the first mobile phone includes:
receiving a client side public key storing request from the first mobile phone that includes at least the client side public key, a device serial number of the first mobile phone, the owner name of the first mobile phone and the phone number of the first mobile phone;
determining whether the first mobile phone is registered based on whether the device serial number matches a pre-stored serial number stored in a device register;
in response to a determination that the first mobile phone is registered, updating a client side public key with the received client side public key; and
in response to a determination that the first mobile phone is not registered, storing the owner name of the first mobile phone, the phone number of the first mobile phone, the client side public key and the device serial number in the device register.

25. A method of incoming communication control, the method comprising:
receiving, by a callee terminal, a telephone call from a caller;
determining, by the callee terminal, whether the telephone call is being placed via a preconfigured server, the callee terminal receiving the telephone call from the preconfigured server when a communication right value passes a predetermined threshold, the predetermined threshold being adjustable, the communication right value resulting from a mathematical operation on a relationship value and a history value, the relationship value depending on whether an address book of a caller terminal includes a phone number of the callee terminal, and whether an address book of the callee terminal includes a phone number of the caller terminal, the history value depending on collected data, the collected data including a selection from a group consisting of a number of past calls and a duration of past calls between the caller and callee terminals;
in response to a determination by the callee terminal that the telephone call is being placed via a preconfigured server, the callee terminal receiving caller information from the preconfigured server that output the telephone call to the callee terminal, and displaying the caller information on the callee terminal; and
in response to a determination that the telephone call is not being placed via a preconfigured server, notifying the caller to dial a preconfigured server to contact the callee terminal.

26. The method of claim 25, wherein the caller information related to the caller terminal includes one or more of an owner's name of the caller terminal, a mobile phone number of the caller terminal, a geographic position of the caller terminal, a combination thereof, and the history value.

27. The method of claim 25, wherein the caller information related to the caller terminal is stored at the preconfigured server.

28. The method of claim 25, wherein the address book of one or more of the caller terminal and the callee terminal has numbers displayed as virtual numbers.

29. A non-transitory computer-readable medium having computer-readable instructions stored thereon to be executed by a computer, the instructions including a method comprising:
receiving, by a callee terminal, a telephone call from a caller;
determining, by the callee terminal, whether the telephone call is being placed via a preconfigured server, the callee terminal receiving the telephone call from the preconfigured server when a communication right value passes a predetermined threshold, the predetermined threshold being adjustable, the communication right value resulting from a mathematical operation on a relationship value and a history value, the relationship value depending on whether an address book of a caller terminal includes a phone number of the callee terminal, and whether an address book of the callee terminal includes a phone number of the caller terminal, the history value depending on collected data, the collected data including a selection from a group consisting of a number of past calls and a duration of past calls between the caller and callee terminals;
in response to a determination by the callee terminal that the telephone call is being placed via a preconfigured server, the callee terminal receiving caller information from the preconfigured server that output the telephone call to the callee terminal, and displaying the caller information on the callee terminal; and
in response to a determination that the telephone call is not being placed via a preconfigured server, notifying the caller to dial a preconfigured server to contact the callee terminal.

30. A method of outgoing communication control, the method comprising sending, by a caller terminal, a communication request to a preconfigured server, wherein the communication request includes at least a caller number and information for determining an identification code of a callee terminal, the information including a number of the callee terminal or an owner of the callee terminal, the preconfigured server forwarding the telephone call to the callee terminal when a communication right value passes a predetermined threshold, the predetermined threshold being adjustable, the communication right value resulting from a mathematical operation on a relationship value and a history value, the relationship value depending on whether an address book of a caller terminal includes a phone number of the callee terminal, and whether an address book of the callee terminal includes a phone number of the caller terminal, the history value depending on collected data, the collected data including a selection from a group consisting of a number of past calls and a duration of past calls between the caller and callee terminals.

31. The method of claim 30 further comprising, prior to sending, by the caller terminal, the communication request to the preconfigured server, sending, by the caller terminal, a request to obtain a digital certificate from the preconfigured server.

32. The method of claim 30, wherein the address book of one or more of the caller terminal and the callee terminal has numbers displayed as virtual numbers.

33. A non-transitory computer-readable medium having computer-readable instructions stored thereon to be executed by a computer, the instructions including a method comprising sending, by a caller terminal, a communication request to a preconfigured server, wherein the communication request includes at least a caller number and information for determining an identification code of a callee terminal, the information including a number of the callee terminal or an owner of the callee terminal, the preconfigured server forwarding the telephone call to the callee terminal when a communication right value passes a predetermined threshold, the predetermined threshold being adjustable, the communication right value resulting from a mathematical operation on a relationship value and a history value, the relationship value depending on whether an address book of a caller terminal includes a phone number of the callee terminal, and whether an address book of the callee terminal includes a phone number of the caller terminal, the history value depending on collected data, the collected data including a selection from a group consisting of a number of past calls and a duration of past calls between the caller and callee terminals.

34. The method of claim 33, further comprising, sending, by the caller terminal to the preconfigured server, a request to obtain a digital certificate from the preconfigured server.

35. A system comprising:
a first mobile phone to send a communication request to communicate with a second mobile phone;
a preconfigured server to:
  determine, and store an association between, a first phone number, a first owner of the first mobile phone, and a first identification code of the first mobile phone, the first mobile phone having a first address book;
  determine, and store an association between, a second phone number, a second owner of the second mobile phone, and a second identification code of the second mobile phone, the second mobile phone having a second address book;
  assign a value to a relationship variable that depends on whether the first address book of the first mobile phone includes the second phone number, and whether the second address book of the second mobile phone includes the first phone number;
  obtain a value of a history variable that depends on collected data, the collected data including a selection from a group consisting of a number of past calls and a duration of past calls between the first and second mobile phones;
  store an association between the relationship variable, the history variable, the first phone number, and the second phone number;
  receive the communication request from the first mobile phone, the communication request providing the first phone number of the first mobile phone and an identity of the second mobile phone;
  determine the second phone number from the identity of the second mobile phone;
  retrieve from storage the value of the relationship variable and the value of the history variable based on the first phone number and the second phone number;
  mathematically operate on the relationship value and the history value associated with the first and second mobile phones to generate a communication right value; and
  make a telephone call to the second mobile phone when the communication right value passes a predetermined threshold, the predetermined threshold being adjustable;
the second mobile phone to:
  receive the telephone call;
  determine whether the telephone call is being placed via the preconfigured server; and
  in response to a determination that the telephone call is being placed via the preconfigured server, receive caller information from the preconfigured server related to the first mobile phone requesting communication with the second mobile phone through the preconfigured server, and display the caller information on the second mobile phone; and
  in response to a determination that the telephone call is not being placed via the preconfigured server, notify an originator of the telephone call to dial the telephone call through a preconfigured server.

36. A non-transitory computer-readable medium having computer-readable instructions to be executed by a computer, the instructions including a method comprising:
sending, by a first mobile phone, a communication request to a preconfigured server to communicate with a second mobile phone;
determining, and storing an association between, by the preconfigured server, a first phone number, a first owner of the first mobile phone, and a first identification code of the first mobile phone, the first mobile phone having a first address book;
determining, and storing an association between, by the preconfigured server, a second phone number, a second owner of the second mobile phone, and a second identification code of the second mobile phone, the second mobile phone having a second address book;
assigning, by the preconfigured server, a value to a relationship variable that depends on whether the first address book of the first mobile phone includes the second phone number, and whether the second address book of the second mobile phone includes the first phone number;
obtaining, by the preconfigured server, a value of a history variable that depends on collected data, the collected data including a selection from a group consisting of a number of past calls and a duration of past calls between the first and second mobile phones;

storing, by the preconfigured server, an association between the relationship variable, the history variable, the first phone number, and the second phone number;

receiving, by the preconfigured server, the communication request from the first mobile phone, the communication request including the first phone number of the first mobile phone and an identity of the second mobile phone;

determining, by the preconfigured server, the second phone number from the identity of the second mobile phone;

retrieving from storage, by the preconfigured server, the value of the relationship variable and the value of the history variable based on the first mobile phone and the second mobile phone;

mathematically operating on the relationship value and the history value associated with the first and second mobile phones to generate a communication right value;

in response to a determination that the communication right value passes a predetermined threshold, making a telephone call to the second mobile phone, the predetermined threshold being adjustable;

receiving, by the second mobile phone, the telephone call;

determining, by the second mobile phone, whether the telephone call is being placed via the preconfigured server;

in response to a determination that the telephone call is being placed via the preconfigured server, receiving caller information from the preconfigured server related to the first mobile phone requesting communication with the second mobile phone through the preconfigured server and displaying the caller information on the second mobile phone; and in response to a determination that the telephone call is not being placed via the preconfigured server, notifying an originator of the telephone call to dial the telephone call through a preconfigured server.

\* \* \* \* \*